United States Patent [19]

Bossler, Jr. et al.

[11] 4,297,907

[45] Nov. 3, 1981

[54] TORQUE SPLITTING GEAR DRIVE

[75] Inventors: Robert B. Bossler, Jr.; Charles P. Hardersen, both of Bloomfield, Conn.

[73] Assignee: Kaman Aerospace Corporation, Bloomfield, Conn.

[21] Appl. No.: 44,492

[22] Filed: Jun. 1, 1979

[51] Int. Cl.³ .................. F16H 1/20; F16H 35/06; F16H 57/00

[52] U.S. Cl. .................................. 74/417; 74/410; 74/411

[58] Field of Search .......... 74/665 GB, 665 F, 665 G, 74/665 H, 665 P, 705, 410, 411, 412, 416, 417, 423, 424; 115/17, 34 R, 35; 440/75, 70

[56] References Cited

U.S. PATENT DOCUMENTS

| | | | |
|---|---|---|---|
| 1,040,443 | 10/1912 | Sionor | 74/410 |
| 1,244,223 | 10/1917 | McInish | 74/410 |
| 1,304,081 | 5/1919 | Maurer | 74/424 |
| 1,384,483 | 7/1921 | Penrod | 74/410 |
| 1,393,208 | 10/1921 | Erickson et al. | 74/424 X |
| 1,514,522 | 11/1924 | Hilmes | 74/410 |
| 1,881,931 | 10/1932 | Powell | 74/423 X |
| 1,884,657 | 10/1932 | Gerlinger | 74/423 |
| 2,982,144 | 5/1961 | Wallgren | 74/392 X |
| 3,083,680 | 4/1963 | Willis et al. | 115/34 R |
| 3,111,111 | 11/1963 | Willis | 74/423 X |
| 3,259,100 | 7/1966 | Kiekhaefer | 74/411 X |
| 3,368,420 | 2/1968 | Alexander | 115/34 X |
| 3,727,574 | 4/1973 | Bagge | 74/665 P X |
| 3,871,248 | 3/1975 | Barish | 74/665 P |

Primary Examiner—C. J. Husar
Assistant Examiner—Mark A. Daugherty
Attorney, Agent, or Firm—McCormick, Paulding & Huber

[57] ABSTRACT

In a gear drive for drivingly connecting two rotatable shafts the transmitted power and torque is split between two parallel paths to reduce the size and required power handling capacity of the gears and other components. The power and torque is divided between the two paths by an axially shiftable torque distributing member carrying two gears each meshing with a respective one of two other gears each comprising part of a respective one of the two parallel power paths. The torque distributing member is rotatably supported relative to the frame or casing of the drive by a bearing surrounding and engaging the member itself. This accurately locates and fixes the axis of rotation of the member and reduces the bearing requirements for its associated shaft.

15 Claims, 1 Drawing Figure

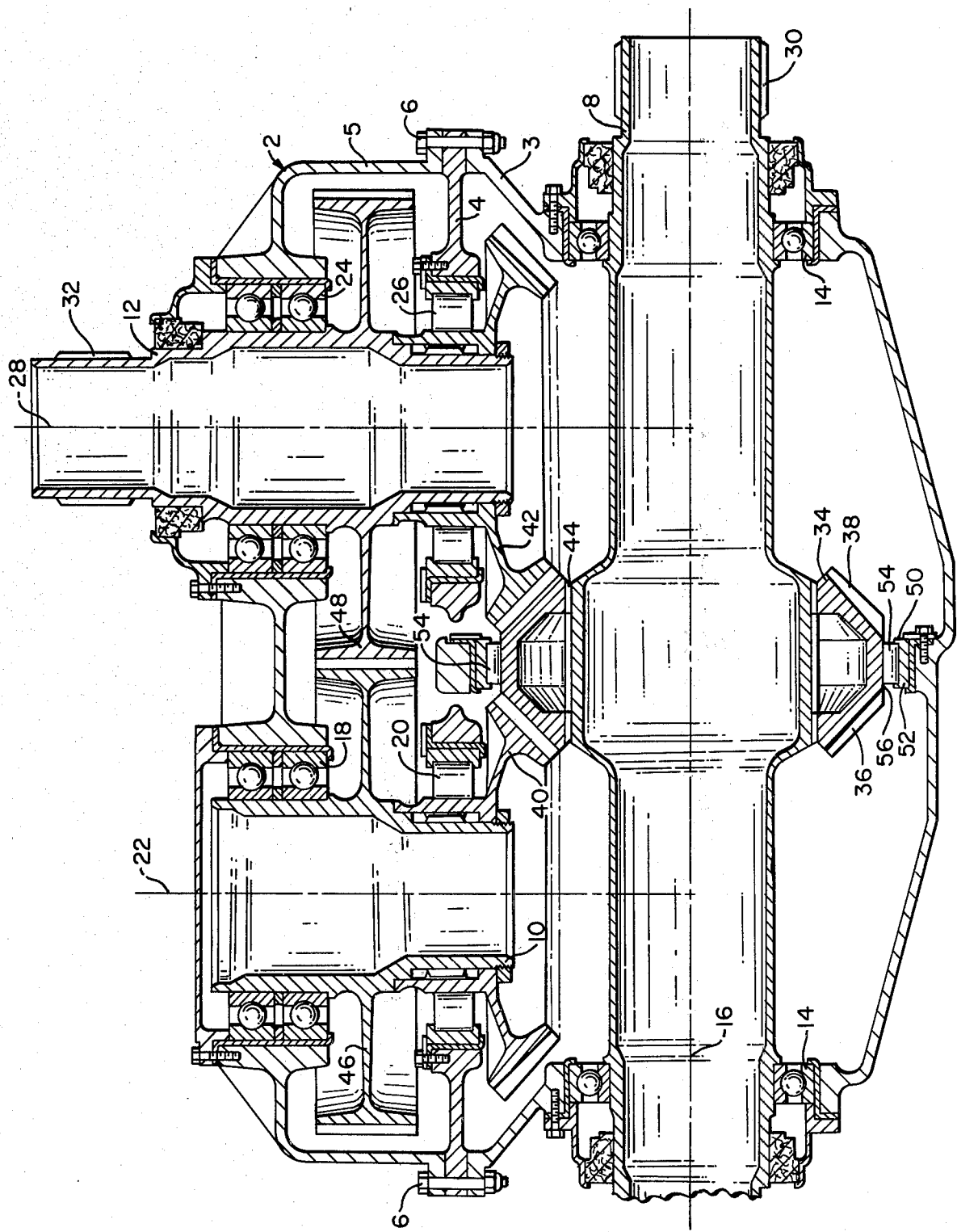

TORQUE SPLITTING GEAR DRIVE

BACKGROUND OF THE INVENTION

This invention relates to torque splitting gear drives, and deals more particularly with an improved means in such drive for providing and supporting a torque distributing gear member which is shiftable axially along its axis of rotation to perform its torque distributing function.

Torque splitting gear drives may be used for various different applications but are particularly useful in cases where it is desired by means of gears to transmit high levels of power between two rotatable shafts. Such desire may arise, for example, from a requirement to change the speed of rotation from one shaft to the other or to accommodate a change in direction where one shaft is at an angle to the other. Where large amounts of power are involved, the gears of conventional gear drives need be relatively large to avoid exceeding their upper power limits. With a torque splitting gear drive, however, the transmitted torque is effectively channeled through two parallel paths each of which carries approximately one-half of the total power, thereby allowing the individual gears to be reduced in size and weight. Examples of previously proposed torque splitting drives of the type to which this invention generally pertains are shown by U.S. Pat. Nos. 1,040,443; 1,514,522; 2,982,144; 3,259,100; and 3,871,248.

An essential element of torque splitting drives, such as those shown by the aforementioned patents, is a torque distributing member carrying two gears respectively meshing with two other gears each belonging to a separate one of the two parallel paths, which member somehow shifts or deflects under the influence of forces imposed thereon by the gears meshed therewith to balance the torque applied to the latter gears. This in turn requires that the torque distributing member be supported in such a way as to be capable of shifting or deflecting precisely and in small amounts as needed to perform its torque distributing function while at the same time also transmitting all of the power applied to the drive.

The general object of this invention is, therefore, to provide a torque splitting gear drive having a torque distributing member supported to provide improved automatic and precise load sharing between the two parallel paths.

A further object of this invention is to provide a torque splitting gear drive of the foregoing character which is easily assembled, which does not require extremely accurate location or rigidity of the shaft carrying the torque distributing member, and wherein the torque distributing member is well restrained against displacement from its normal axis of rotation by forces imposed thereon during operation.

Other objects and advantage of the invention will be apparent from the following description of the preferred embodiment and from the accompanying drawing.

SUMMARY OF THE INVENTION

The invention resides in a novel and improved construction for providing and supporting the torque distributing member of a torque splitting gear drive. In accordance with the invention this member is a body carried by one of the shafts of the drive and providing two gears which mesh with two intermediate gears each fixed to a respective one of two other shafts constituting parts of the two parallel paths through which the power applied to the drive is channeled. A bearing supported by the frame or casing of the drive surrounds and engages the torque distributing member along an axial portion thereof to rotatably support it for rotation relative to the frame and to also permit it to move axially relative to the frame in performance of its torque splitting function.

In accordance with other narrower aspects of the invention the torque distributing member is separate from its associated shaft and is drivingly connected with such shaft through inter-engaging splines which allow the body to move axially. Also, the torque distributing member itself has an external cylindrical race surface providing a race for the bearing and such surface is located between the two gears of the torque distributing member and defines the maximum diameter of that member.

BRIEF DESCRIPTION OF THE DRAWING

The drawing is a sectional view taken through a torque splitting gear drive embodying the invention, such view being taken on a plane containing the axes of the three shafts of the drive.

DETAILED DESCRIPTION OF THE PREFERRED EMBODIMENT

Referring to the drawing, the illustrated torque splitting gear drive includes a frame or casing indicated generally at 2 and comprised of a lower part 3, an intermediate part 4 and an upper part 5 which are held in assembly by a plurality of fasteners such as the ones indicated at 6, 6. The drive has a first shaft 8, a second shaft 10 and a third shaft 12 each rotatably supported for rotation relative to the frame 2 about an associated axis fixed relative to the frame. Such support for the shaft 8 is provided by the bearings 14, 14 which support that shaft for rotation about an associated first axis 16. The bearings 18 and 20 support the second shaft 10 for rotation about an associated second axis 22; and the bearings 24 and 26 support the third shaft 12 for rotation about an associate third axis 28.

Either the first shaft 8 or the third shaft 12 may be the input shaft with the other being the output shaft, however, for the present description the shaft 8 will be taken to be the input shaft and the shaft 12 the output shaft. Therefore, in use of the drive the shaft 8 will be drivingly connected to an engine or some other prime mover and the shaft 12 will be connected to a power absorbing device or load. For connection to a power delivering rotary member the input shaft 8, at its right-hand end includes a series of splines 30 or other suitable attachment means. Likewise, for connection to a power absorbing rotary output member associated with the load the output shaft 12 has a series of splines 32 or other suitable attachment means. At its left-hand end the input shaft 8 extends beyond the case or frame 2 and, if desired, may be adapted to drive some other accessory or load which may possibly include another torque splitter similar to the one illustrated.

Mounted on the input or first shaft 8 is a torque distributing member 34 having two spiral bevel gears 36 and 38 which mesh with two intermediate spiral bevel gears 40 and 42 fixed respectively to the shaft 10 and the shaft 12. The member 34 is connected to the shaft 8 through inter-engaging splines, indicated at 44, on the member and on the shaft which constrain the member to rotate with the shaft while allowing it to move or slide axially on the shaft.

When the input shaft 8 is rotated the torque distributing member 34 simultaneously drives both of the intermediate gears 40 and 42. The meshing of the gears 36 and 40 develops a separating force at the mesh point and a component of such force, which is parallel to the axis 16 of the shaft 8 and proportional to the torque transmitted between the two gears, is imposed on the member 34 to urge it to the right in the figure. Likewise, the meshing of the two gears 38 and 42 causes a similar force component, proportional to the torque transmitted between the gears 38 and 42, to be imposed on the member 34 urging it to the left in the figure. Motion of the member 34 from right to left causes the gear 40 to increase its share of the total torque and the gear 42 to decrease its share of the total torque. Similarly, motion of the member 34 from left to right causes the gear 42 to increase its share of the total torque and the gear 40 to decrease its share of the total torque. The net result is that the two mutually opposed axially directed components of the separating forces which are applied to the member 34 will drive that member into a balanced force position resulting in an automatic and precise splitting of the torque, and transmitted power, between the two gears 40 and 42.

The shaft 10 represents one, and the shaft 12 represents the other, of two parallel paths through which the split or divided torque and power are channeled. Both of these shafts are in turn drivingly connected by a gear means constraining them to rotate in unison and causing the split or divided power to be combined and channeled into the output shaft 12. Such gear means in the illustrated case comprises a gear 46 fixed to the shaft 10 and a similar gear 48 fixed to the shaft 12 and meshing with the gear 46.

The two gears 36 and 38 of the torque distributing member 34 may be separate units suitably fixed to the remainder of the member 34 but, preferably, the member 34 is a one-piece body of which the gears 36 and 38 are integral parts.

In keeping with the invention, the torque distributing member 34 is itself separately supported for rotation relative to the frame or casing about the first axis 16 apart from the means which rotatably support its associated shaft 8. As shown, this means comprises a relatively large diameter bearing 50 which surrounds and engages the member 34 in such manner as to constrain it to rotation about the axis 16 while nevertheless allowing it to move freely in the axial direction. The bearing 50 may take various different forms and constructions but preferably, and as shown, it is a roller bearing having an outer race member 52 fixed to and supported by the frame 2 and having a number of right cylindrical rollers 54, 54. These rollers engage a right cylindrical external race surface 56 formed directly on the member 34. Further, the two gears 36 and 38 are located at opposite axial ends of the member 34 and are axially spaced from one another to provide an intermediate portion of the member 34 on which the race surface 56 is formed. The race surface is also the maximum diameter surface of the member 34 which allows the bearing 50 to be easily assembled with the member.

From the foregoing, and from the drawing, it will be understood that the bearing 50 securely supports the torque distributing member 34 for rotation about the axis 16 and rigidly resists deflection of the member away from such rotative axis as by radially directed components of separating forces imposed on the member by the gears 40 and 42. Also, because of the separate bearing supporting the member 34 the inter-engaging splines 44 of the member 34 and the shaft 8 are relieved of radial loads which thereby enhances the freedom of the member 34 to shift axially as required to perform its torque splitting function. Still further, the separate support for the member 34 allows more tolerance in the positioning of the shaft 8 and reduces the loads which the bearings for such shaft would otherwise have to carry.

We claim:

1. A torque splitting gear drive having a frame, first second and third shafts supported for rotation relative to said frame about first, second and third axes respectively, first and second gears carried by said first shaft and movable in unison along said first axis, two intermediate gears each fixed to a respective one of said second and third shafts and each meshing with a respective one of said first and second gears, and other gear means drivingly connecting said second and third shafts and compelling said second and third shafts to rotate in unison, further characterized by said first and second gears both being part of a torque distributing member carried by but separate from said first shaft, means connecting said member to said first shaft whereby it is constrained to rotate with and is free to move axially relative to said first shaft, and a bearing supported by said frame and surrounding and engaging said member along an axial portion thereof to rotatably support it for rotation relative to said frame about said first axis and to permit it to move axially relative to said frame and to said first shaft.

2. A torque splitting gear drive as defined in claim 1 further characterized by said torque distributing member having an external cylindrical race surface providing a race for said bearing.

3. A torque splitting gear drive as defined in claim 2 further characterized by said bearing being a roller bearing having rollers engaging said race surface of said torque distributing member.

4. A torque splitting gear drive as defined in claim 2 further characterized by said torque distributing member being a one-piece body with said first and second gears and said race surface all being part of said one-piece body.

5. A torque splitting gear drive as defined in claim 2 further characterized by said race surface being a right cylindrical surface, and said bearing being a roller bearing having right cylindrical rollers engaging said race surface whereby said rollers restrain said torque distributing member to rotation about said first axis while allowing said torque distributing member to move axially of said first axis.

6. A torque splitting gear drive as defined in claim 1 further characterized by said first and second gears of said torque distributing member being spaced from one another along said first axis, and said bearing engaging said member along a portion thereof located axially between said first and second gears.

7. A torque splitting gear drive as defined in claim 6 further characterized by said torque distributing member having an external cylindrical race surface located axially between said first and second gears providing a race for said bearing.

8. A torque splitting gear drive as defined in claim 7 further characterized by said race surface having a diameter which is the maximum diameter of said torque distributing member.

9. A torque splitting gear drive as defined in claim 1 further characterized by said other gear means including two other gears each fixed to a respective one of said second and third shafts and which two other gears mesh with one another to compel said second and third shafts to rotate in unison.

10. A torque splitting gear drive as defined in claim 1 further characterized by said means connecting said member to said first shaft being interengaging splines on said first shaft and on said member.

11. A torque splitting gear drive as defined in claim 1 further characterized by said means connecting said torque distributing member to said first shaft comprising an axial zone on said first shaft having a splined external surface and a complementary splined internal surface on said torque distributing member surrounding said axial zone of said first shaft, and said torque distributing member being a one-piece body with said first and second gears, said race surface and said internal surface all being part of said one-piece body.

12. A torque splitting gear drive having a frame, first, second and third shafts supported for rotation relative to said frame about first, second and third axes respectively, first and second gears carried by said first shaft and movable in unison along said first axis, two intermediate gears each fixed to a respective one of said second and third shafts and each meshing with a respective one of said first and second gears, and other gear means drivingly connecting said second and third shafts and compelling said second and third shafts to rotate in unison, further characterized by said first and second gears being axially spaced from one another along said first axis and being part of a body including an intermediate portion located axially between said first and second gears, and a bearing supported by said frame and surrounding and engaging said body at said intermediate portion thereof to rotatably support said body for rotation relative to said frame about said first axis and to permit said body to move along said first axis relative to said frame.

13. A torque splitting gear drive as defined in claim 12 further characterized by said intermediate portion of said body having an external cylindrical race surface forming a race for said bearing.

14. A torque splitting gear drive as defined in claim 13 further characterized by said race surface being a right cylindrical surface and said bearing being a roller bearing having right cylindrical rollers engaging said race surface.

15. A torque splitting gear drive as defined in claim 12 further characterized by said intermediate portion of said body having an external cylindrical surface with a diameter which is the maximum diameter of said body.

* * * * *